(12) United States Patent
Chaudhary et al.

(10) Patent No.: US 7,155,526 B2
(45) Date of Patent: Dec. 26, 2006

(54) METHOD AND SYSTEM FOR TRANSPARENTLY AND SECURELY INTERCONNECTING A WLAN RADIO ACCESS NETWORK INTO A GPRS/GSM CORE NETWORK

(75) Inventors: Mayank S. Chaudhary, Union City, CA (US); Allam Zaheer Ahmed, Fremont, CA (US); Nishi Kant, San Jose, CA (US); Chih-hsin Alan Chuang, Mountain View, CA (US); Michael W. Ritter, Los Altos, CA (US)

(73) Assignee: Azaire Networks, Inc., Santa Clara, CA (US)

( * ) Notice: Subject to any disclaimer, the term of this patent is extended or adjusted under 35 U.S.C. 154(b) by 728 days.

(21) Appl. No.: 10/176,198

(22) Filed: Jun. 19, 2002

(65) Prior Publication Data

US 2004/0139201 A1    Jul. 15, 2004

(51) Int. Cl.
*G06F 15/16* (2006.01)
(52) U.S. Cl. ............... 709/229; 709/229; 709/249; 455/411; 370/285; 713/166
(58) Field of Classification Search ............... 709/223, 709/229, 249; 455/411; 370/285; 713/166
See application file for complete search history.

(56) References Cited

U.S. PATENT DOCUMENTS

| | | | |
|---|---|---|---|
| 6,404,754 B1 * | 6/2002 | Lim | 370/338 |
| 6,741,868 B1 | 5/2004 | Park et al. | |
| 6,766,377 B1 | 7/2004 | Grabelsky et al. | |
| 2002/0012433 A1 * | 1/2002 | Haverinen et al. | 380/247 |
| 2002/0085516 A1 * | 7/2002 | Bridgelall | 370/329 |
| 2002/0147008 A1 * | 10/2002 | Kallio | 455/426 |
| 2004/0029555 A1 | 2/2004 | Tsai et al. | |

FOREIGN PATENT DOCUMENTS

WO    WO 03/090013 A2    10/2003

OTHER PUBLICATIONS

Ala-Laurila et al, "Wireless LAN Access Network Architecture For Mobile Operators," *IEEE Communications Magazine*, pp. 82-89, Nov. 2001.
"Wireless LAN Access Network Architecture for Mobile Operators", ala-Laurila et al., IEEE Communicatins Magazine, vol. 39, Issue 11, Nov. 2001, pp. 82-89.

(Continued)

*Primary Examiner*—Saleh Najjar
*Assistant Examiner*—Thuong Nguyen
(74) *Attorney, Agent, or Firm*—Groover Holmes

(57) ABSTRACT

A method and system are provided for integrating a WLAN radio access network into a GSM/GPRS core network wherein gateways are added that transparently transport services between the two networks. A further aspect of the invention is secure authentication. The system has two network elements: a Radio Link Manager (RLM) and a Radio Access Controller (RAC), and a software application, a Multi-Link Client (MLC) to control the functionality of the integration and the authentication. The MLC resides on a user device. The RAC provides protocol stacks and interworking functions to allow the MLC to talk to a Home Location Register (HLR). The RLM and MLC set up a "tunnel" employing, for example, PPP over Ethernet (PPPOE), and all of the data packets received on this tunnel are forwarded by the RLM to the Gateway GPRS Support Node (GGSN over a further tunnel using the GPRS Tunneling Protocol (GTP).

11 Claims, 5 Drawing Sheets

OTHER PUBLICATIONS

"Interworking Architecture Between 3GPP and WLAN Systems", Kalle Ahmavaara et al., IEEE Communications Magazine, Nov. 2003, pp. 74-80.

GPRS Tunnelling Protocol (GTP), Third Generation Partnership Project (3GPP TM), Version 7.10.0 (202-12), pp. 14-17.

* cited by examiner

METHOD AND SYSTEM FOR TRANSPARENTLY AND SECURELY INTERCONNECTING A WLAN RADIO ACCESS NETWORK INTO A GPRS/GSM CORE NETWORK

CROSS-REFERENCES TO RELATED APPLICATIONS

NOT APPLICABLE

STATEMENT AS TO RIGHTS TO INVENTIONS MADE UNDER FEDERALLY SPONSORED RESEARCH OR DEVELOPMENT

NOT APPLICABLE

REFERENCE TO A "SEQUENCE LISTING," A TABLE, OR A COMPUTER PROGRAM LISTING APPENDIX SUBMITTED ON A COMPACT DISK.

NOT APPLICABLE

BACKGROUND OF THE INVENTION

The present invention relates to interworking of wireless local area networks (WLANs) with cellular networks in order to provide connectivity for packet data services for cellular networks, particularly GSM-based cellular networks. The invention also relates to techniques to overlay security and privacy onto network elements that do not provide such.

There is a need for a solution that provides high-speed wireless data networking for a customer of GSM services. It is desirable to do so without modifying the core network elements of any GSM service and particularly those that have already deployed support for GSM Packet Radio Services (GPRS). By leaving the core network intact, it is believed that the cost of adding high-speed wireless data networking to a GSM network can be reduced.

Add-on high-speed wireless services must be provided as efficiently and inexpensively as possible in order to compete with integrated services. A first step towards achieving this goal would be to use standard-based networking elements, such as, but not limited to, WLAN devices using the IEEE 802.11b networking protocols. However, these networking protocols are relatively rudimentary and provide specifications merely for the first two layers of a typical Open Systems Interconnection (OSI) defined seven-layer stack: The physical layer and the Media Access and Control (MAC) layer.

FIG. 1 illustrates the conventional OSI model applied to an IEEE 802.11 and Internet Engineering Task Force (IETF) stack for a wireless LAN. In the past, in order to interconnect this stack to the GSM stack at the top or application level, application gateways had to be provided. This interface methodology for interoperation with WLAN systems is difficult for GSM/GPRS services to provide because GSM/GPRS services are based on completely different standards and provide many features not found in the IETF and IEEE 802.11b stacks. For instance, IETF systems do not yet provide the functionality needed to support GSM services. IETF protocols do not provide a secure authentication system for interoperation with the GSM authentication system, accounting functions are in different formats, allocation of customer IP addresses is handled at a different layer of the networking stacks, roaming features are incompatible, and the IETF does not specify a micro-mobility handover protocol such as that which is detailed in GSM. In fact, when interoperating IETF and GSM systems, the typical GSM service would simply deploy two separate systems and consolidate billing afterwards. This solution is undesirable, because it is difficult for the GSM operator to manage two disparate customer databases, provide two different servers and clients for each additional service they wish to deploy, and manage two entirely different network systems with different network management systems.

Therefore, there is a need for a set of interworking network elements that either translates services or provides additional services over the WLAN radio access network. In addition, there is a need to provide an architecture for interworking elements in a manner that requires little or no modifications to the GSM system.

There have been various efforts to address and improve the deployment of high-speed data services using WLAN. One such method provided by several vendors uses interworking elements between the WLAN and typical Internet Service Provider (ISP) core networks. In this method, WLAN Access Points (APs) providing physical layer and MAC layer functionality are connected to modified Internet Protocol (IP) routers. These routers typically support routing layer IETF standards such as, but not limited to, Routing Internet Protocol (RIP), and they typically use IETF standards-based authentication and accounting systems that incorporate protocols such as, but not limited to, Remote Access Dial In User Service (RADIUS).

Realizing these difficulties, several vendors (Cisco Systems of Santa Clara, Calif., Service Factory of Stockholm, Sweden, and Lucent Technologies) have tried to provide interworking elements in order to handle each of the above-described faults and many additional problems. For instance, several vendors have added features to the Access Points in order to add higher networking layer functionality such as authentication and security. This method is not ideal, because there is no IETF standard covering this area at this time. As such, using customized Access Points requires a GSM/GPRS service to deploy only those APs that are able to support these proprietary protocols. In addition, some vendors that have built additional features and functionalities into their WLAN client hardware have limited the type of network interface cards that customers can use to connect into the network and thus causes additional incompatibilities, which is particularly undesirable if the customer does not have the option of using a customized interface.

Realizing this difficulty, some vendors (Nokia of Finland, Cisco Systems, IP Unplugged of Sweden, PC Tel of Santa Clara, Calif.) have concentrated on providing back-end solutions to the billing and provisioning systems by adding so-called Charging Gateways. These gateways translate the billing records coming out of the standard IETF systems into the proprietary systems used by the GSM/GPRS services. Since there are no standards for billing systems, it is difficult to ensure transparency for new and future modifications to existing services.

Other vendors (Transat of Houston, Tex. and Interwave of Menlo Park, Calif.), recognizing these difficulties, have built stand-alone GSM/GPRS systems that communicate with customers using WLAN facilities, thereby replacing all of the core network functions and capabilities that exist in the GSM/GPRS core network. This system is also not desirable because the GSM/GPRS service must nonetheless continue to operate two distinct networks with different management and configuration commands and additional hardware and software, even though it provides the GSM operator with a more familiar replacement network.

Therefore, there is a need for an interworking system between the WLAN radio access network and the GSM/GPRS core network that enables the GSM service to transparently connect users over this new radio access network, while providing to GSM customers all of the services that the customers have come to expect. In addition, it would be useful if this interworking system could be extended in order to support other radio access networks such as 3G, 802.11a, or HIgh PErformance Radio Local Area Networks (HIPERLAN) in the future with little or no additional modification. Such a system would eschew any requirements for the WLAN elements to be modified and would interconnect the two networks at the lowest networking layers possible, as well as provide additional features at the lowest networking layers possible in order to make best possible use of the GSM standards already deployed. These features should be provided via separate networking elements. In this way, functionality can be added to other radio access networks with little additional work.

SUMMARY OF THE INVENTION

According to the present invention, a method and system are provided for integrating a WLAN radio access network into a GSM/GPRS core network wherein gateways are added that function to transparently transport services between two dissimilar types of networks such as WLAN and GSM. A further aspect of the invention is secure authentication. The system according to the invention has two network elements, a Radio Link Manager (RLM) and a Radio Access Controller (RAC), and a software application, a Multi-Link Client (MLC) to control the functionality of the integration. The MLC resides on a user device such as, but not limited to, a Laptop, PDA, or cellular telephone. The WLAN Radio Access Network (RAN) comprises a client radio, which is typically either built into a client computing device or installed via a PCMCIA card, and an Access Point (AP), which provides translation of the wireless signals from the client radio onto a wired networking protocol. According to the method of the invention, in order to connect this RAN to the GSM/GPRS core network, the Radio Link Manager is located between the AP and the Core Network (CN) and provides an endpoint for a secure connection from the MLC software on the client computing device. The RLM forwards authentication messages from the MLC to the RAC. The RAC provides protocol stacks and interworking functions in order to allow the MLC to talk to a Home Location Register (HLR), which is a standard network element in the GSM core network that handles authentication. After the customer is authenticated, the RLM and the MLC set up a "tunnel" employing Point-to-Point Protocol (PPP) Over Ethernet (PPPOE), and all of the data packets received on this tunnel are forwarded by the RLM to the Gateway GPRS Support Node (GGSN), a standard network element in the GSM/GPRS network that provides interconnection to the Internet or other packet data network. In order to do this forwarding, the RLM sets up a tunnel using GPRS Tunneling Protocol (GTP) from the RLM to the GGSN. Alternatively, a datalink tunnel could be from the RLM to an Internet gateway that has tunneling capabilities and address assignment capabilities as part of a global packet data network. Examples are Generic Routing Encapsulation (GRE) protocol, IP in IP tunneling, Layer 2 Transport Protocol (L2TP), Mobile IP, and Metricom's Ricochet Tunneling Protocol related to disparate mesh networks. There may be other examples, which are equivalent but not foreseeable at the present time.

The two networks can interoperate seamlessly, allowing a customer to continue receiving all of the networking services currently available under GSM regardless of the radio access network that is utilized at a given time.

The invention will be better understood by reference to the following detailed description in connection with the accompanying drawings.

DESCRIPTION OF SPECIFIC EMBODIMENTS OF THE INVENTION

Figure 1:
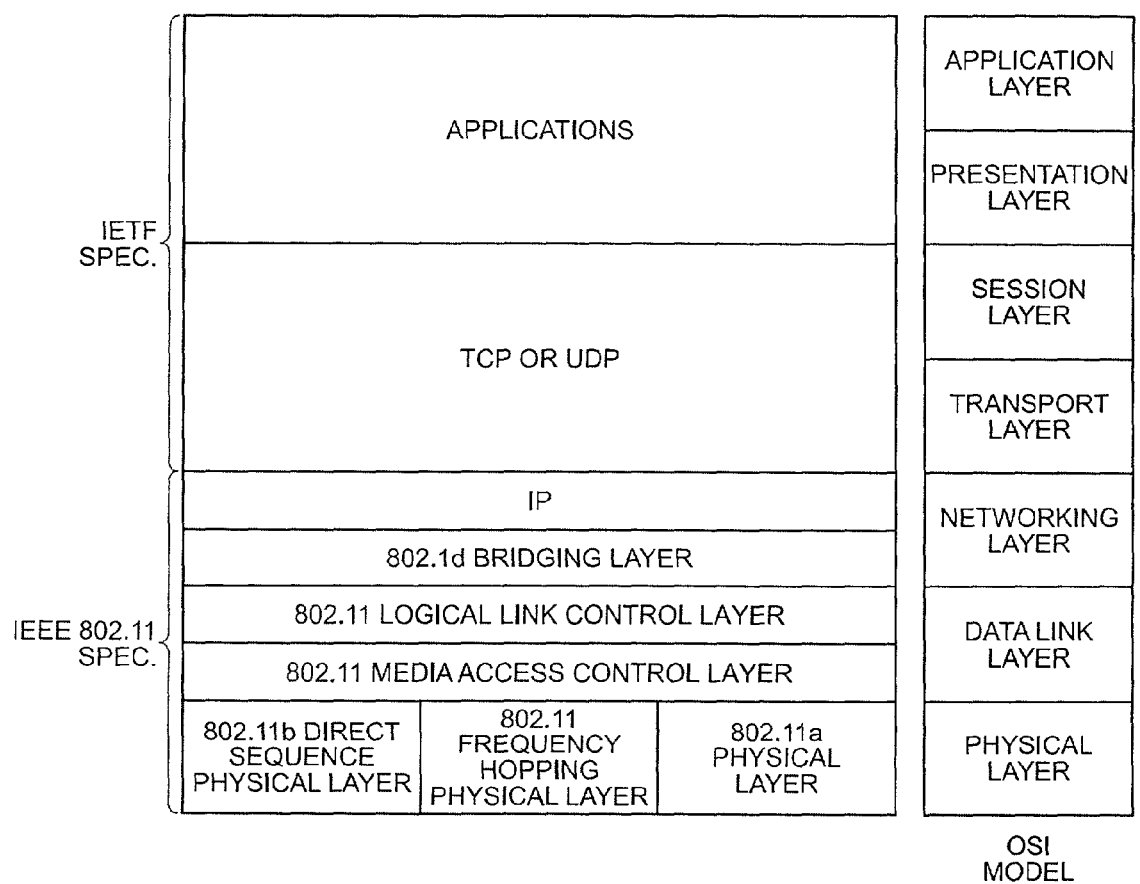
FIG. 1 depicts the network stack for the IEEE WLAN specifications and the network stack specified by the IETF for the Internet protocol and compares it to the OSI model of networking. (Prior Art)

The present invention is a method and apparatus for connecting a Wireless Local Area Network Radio Access Network (WLAN RAN) to a GSM cellular telephone system that is upgraded with GPRS capabilities. In order to provide GPRS capabilities, the GSM network must add a Serving GPRS Support Node (SGSN) 304 as well as a Gateway GPRS Support Node (GGSN) 326 as shown in FIG. 3.

In order to understand the improvement represented by the present invention, it is helpful to first identify those elements that are known in the art. The standard network elements in GSM/GPRS are shown on the left side of FIG. 3. Before a GPRS upgrade, the cellular system supports voice calls that are routed from a Base Station Controller (BSC) 303 to a Mobile Switching Center (MSC) 327 and thence onto the Public Switched Telephone Network (PSTN) 329. For GPRS, which supports data, the data connections are routed from the BSC 303 to the SGSN 304, then to a GGSN 326 and thence to a Packet Data Network (PDN) 306. The path of the signals over the air for GPRS is physically the same as for voice calls. However, GPRS uses different protocols on all of the connections. In conventional operation, a user device 301 supports a GPRS radio air link 313 and sends packets to a Basestation Transmitter Server (BTS) 302. The BTS 302 forwards the packets over a direct connection 14 to one of the BSCs 303 using frame relay or other protocol. The BTS 302 and BSC 303 also handle voice calls and all of the additional complexity required for such traffic. Data packets, however, are always routed through the direct connection 315 to a SGSN 304. The SGSN 304 then routes the data packets through the network connection 317 to the GGSN 326, typically using GTP over internet protocols. The SGSN 304 also regulates and records the Quality of Service (QOS) of the data packet connection and the number of packets and duration of connections as defined in GPRS protocols. The SGSN 304 transmits this information over a direct connection 316 to a Charging Gateway Function 305 in order to allow users to be billed according to the Quality of Service (QOS). The SGSN 304 also relays the authentication protocol from a Subscriber Identity Module (SIM) 417 (FIG. 4) inside the User Equipment (UE) 301 to a Home Location Register (HLR) 311 over a Signaling System 7 (SS7)-type network 324 using Mobile Application Part (MAP) protocol. The GGSN 326 routes the data packets over the network 319 typically using the Internet protocol to a Public Data Network (PDN) 306, typically the Internet.

Figure 3:
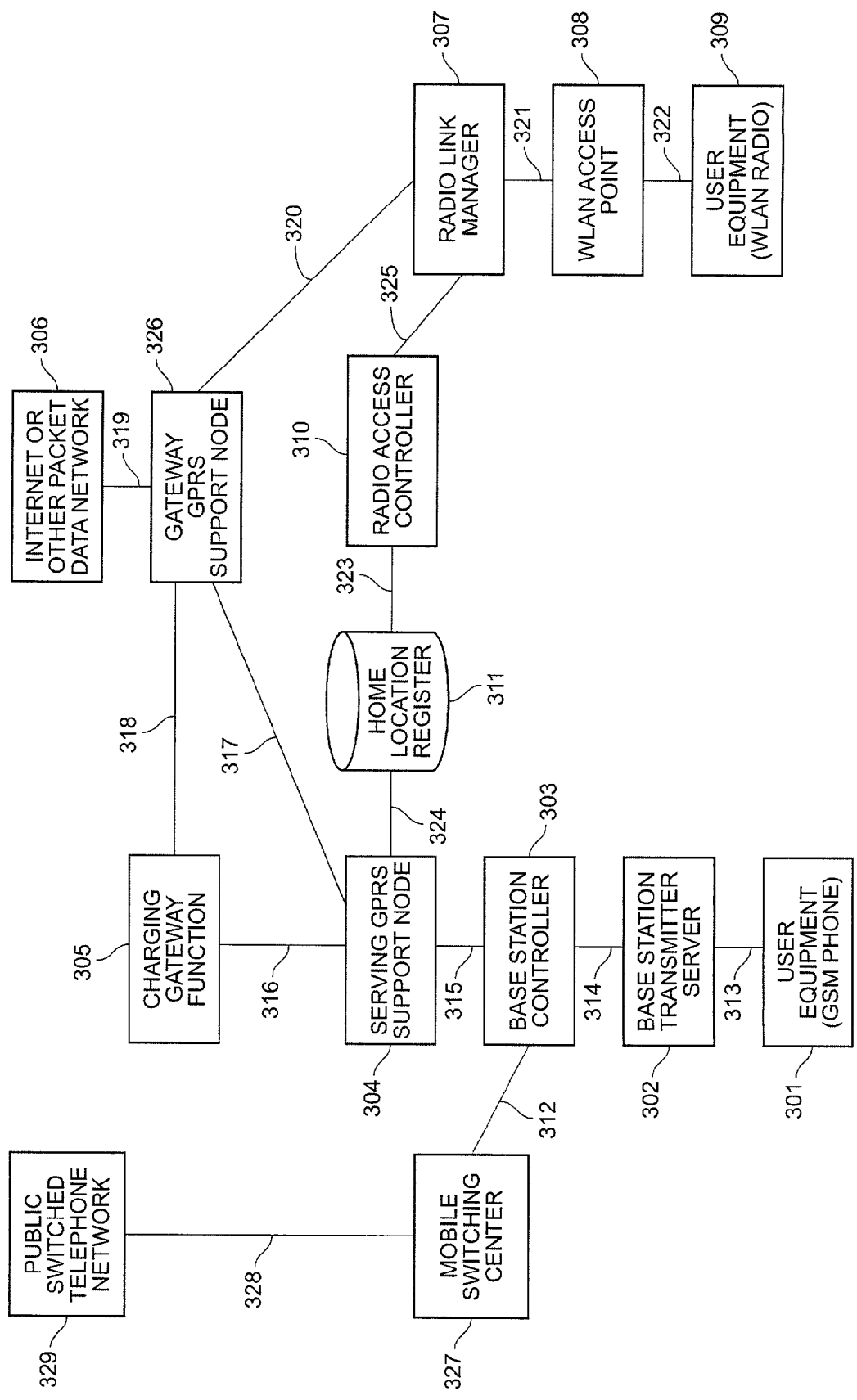
FIG. 3 depicts a GSM network as upgraded to support GPRS and WLAN according to the present invention.

According to the invention, and referring now to the right side of FIG. 3, the data packet sent from the UE 309 supporting WLAN is eventually sent to the PDN 306. The data packet is sent over a WLAN air link 322 from the UE 309 to a WLAN Access Point (AP) 308. The AP 308 forwards the packet to a Radio Link Manager (RLM) 307 over the bridged network 321, typically Ethernet, but possibly over DSL, fiber, or other suitable physical medium. The RLM 307 forwards the data packet over network 320, typically using GTP over the Internet Protocol (GTP/IP), to the GGSN 326. The GGSN 326 then forwards the data packets to the packet data network 306 over the network connection 319, typically using the Internet Protocol. In the invention herein described, the network elements for providing interworking functions to WLAN split the data packets and control packets of the protocols from the UE 301 at the RLM 307 to the different network elements only as needed. The authentication packets are routed to the Radio Access Controller (RAC) 310 over the network connection 325, typically using the RLM to RAC (RR) protocol over the Internet protocol. The RAC 310 forwards the authentication packets to the HLR 311 over the SS7 network 323 using MAP. The authentication protocol operates from the UE supporting WLAN 309 using its SIM card via the Multi-Link Client software. In GPRS or in WLAN, the GGSN 326 sends charging data over the direct connection 318 to the Charging Gateway Function 305. The Charging Gateway Function records the total connection time and quantity of data packets sent by the UE 309 or 301 to the PDN 306.

In the case of WLAN, there is no QOS on the air link 322, unlike in the case of GPRS, where the BTS 302 can provide QOS over the air link 313. In GPRS, this information is recorded and sent to the Charging Gateway Function 305 via the direct connection 316 from the SGSN 304. In the WLAN case, this information is not needed and thus can be ignored.

To the core network elements of GSM, which has the GGSN 326 and the Charging Gateway Function 305, the WLAN connection now emulates a GPRS connection. The RLM 307 emulates the SGSN 304 for the connection to the GGSN 326. The RAC 310 emulates the SGSN 304 for the connection to the HLR 311, while the SGSN 304 connection to the Charging Gateway Function is not needed for WLAN, because there are no QOS capabilities in the WLAN air link. In this manner, provisioning of the WLAN service for a particular user can be entered into the HLR 311 in the same manner that the user's GPRS service is entered. Billing can also be done at the Charging Gateway Function 305 in an exactly analogous manner. Thus, with the internetworking functions provided by the RLM 307 and the RAC 310, the WLAN RAN can be connected to a GSM/GPRS core network with no modifications to the core network or to any procedures that are used to manage and provision services on said core network.

Figure 2:
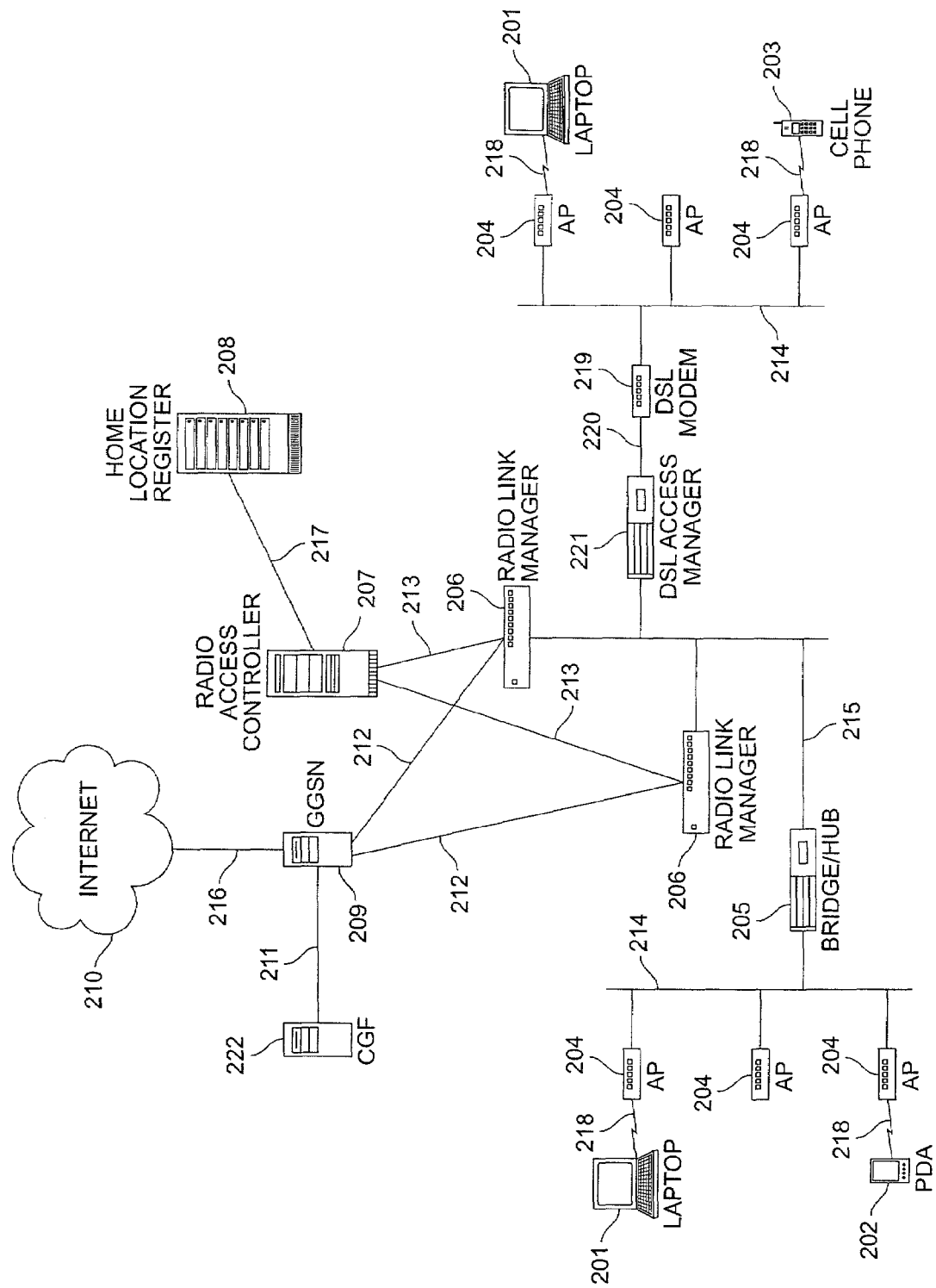
FIG. 2 depicts an ipRAN for WLAN architecture according to the invention.

Referring to FIG. 2, a specific embodiment of the hardware elements that implement the invention is shown. Other embodiments may be obvious to one skilled in the art of networking and are not precluded by the description herein. The interworking elements between the WLAN and the core GSM/GPRS network include an MLC (Multi-Link Client) which is software on the client hardware 201, an RLM (Radio Link Manager) 206 which is the routing and control point for authentication and data flow, and the RAC (Radio Access Controller) 207, which is the interworking element for authentication and provisioning.

The user equipment UE is a computing device with a WLAN radio, such as, but not limited to, a Personal Data Assistant (PDA) 202, a cellular telephone 203 or a laptop 204. An air link 218 used by the WLAN radio embedded in the computing devices 202, 203, or 204 may be based on the IEEE 802.11b specification or may be based on any other air link that can be translated onto a bridged network via the Access Point (AP) 204. Examples of other air link protocols and radios that may be used are the IEEE 802.11a or 802.11g specifications, the HIPERLAN specification, or some other air link yet to be determined. In the preferred embodiment, the only requirement is that the AP 204 supports the IEEE 802.1D bridging protocol specification. This protocol can be run using the physical layer of Ethernet on the network 214 through a bridge or hub 205 that forwards packets over the network 215 to the RLM 206. The network 215 can also use Ethernet, but the bridge or hub 205 may be replaced with a DSL (Digital Subscriber Line) modem 219 and a remote DSLAM (Digital Subscriber Line Access Manager) 221 connected by a twisted pair copper wire 220, as long as the packet appears on network 215 just as it did on network 214 and as long as the IEEE 802.1D bridging protocol specification is met between both physical network connections 214 and 215, in order for both to appear as one bridged network to the RLMs 206. Other methods of connecting the APs 204 to the RLMs 206 should be evident to one skilled in the art of networking. It is also evident to one skilled in the art of networking that the number of APs 204 on networks 214 is not fixed, as many as needed may be used for redundancy and capacity.

Figure 4:
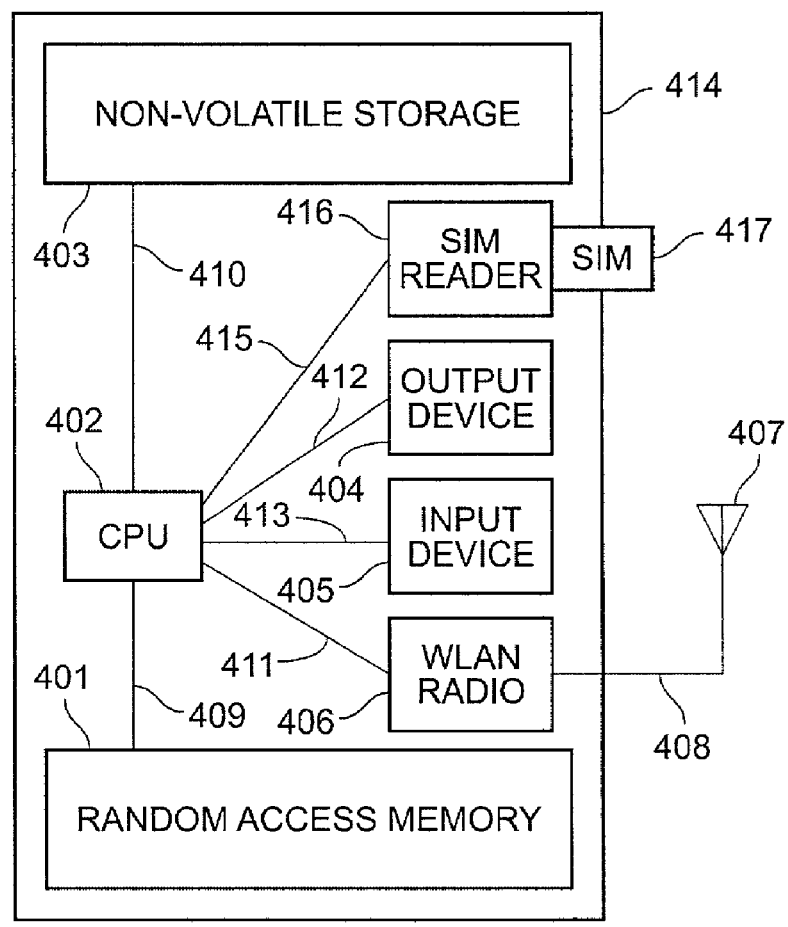
FIG. 4 depicts user equipment necessary in a specific embodiment of the present invention.

The UE 201, 202, or 203 is shown in detail in FIG. 4. The UE 201 has a device case 414 containing a CPU (Central Processing Unit) 402 that communicates over a connection or bus 410 with non-volatile storage 403 where various programs in the form of software instructions control the several devices 405, 406, 404, and 417, and perform their functions in the UE by being interpreted by the CPU instruction-by-instruction. The Multi-Link Client software is stored in the UE non-volatile storage 403 as well. When the UE is powered on, the CPU 402 may copy the programs to Random Access Memory 401 over a connection or bus 409, or may run the programs directly from non-volatile storage 403. The user equipment typically has, but is not required to have, an output device 404, such as a screen or a speaker that communicates over connection 412 to the CPU 402. This output device 404 can be controlled by the programs resident in non-volatile memory 403 or random access memory 401. The device typically has, but is not required to have, an input device 405 such as a keyboard, a mouse, or a microphone that communicates to the CPU 402 over connection 413. This input device 405 can be controlled by the programs resident in non-volatile memory 403 or random access memory 401. The UE device must have a WLAN radio 406 or equivalent that is connected to the CPU 402 over a connection or bus 411 and connected to an antenna 407 over connection 408, typically but not necessarily outside the device box 414. In the preferred embodiment the device has a SIM reader 416 connected to the CPU 402 via connection 415 that can accept a SIM card 417 and send and receive information from the SIM card 417.

In a specific embodiment, this SIM Card information is sent to the CPU 402 over connection or bus 415. The SIM Reader 416 may be embedded in the device case 414, or may be external to the device case 414.

An appropriate method is used to invoke and run the software program called the MLC (Multi-Link Client), on user equipment 201, 202, or 203 such as, but not limited to, the user of the equipment clicking on an icon on a screen (output device 404) using a mouse (input device 405), or in an alternative embodiment, a program pre-installed on the user equipment may recognize a signal from the WLAN radio 406 sent over the connection 411 to the CPU 402 that alerts the MLC software to the fact that the WLAN radio 406 can attach itself to an AP 204.

In an alternative embodiment, a button (input device 405) may be pressed or some other method may be used as would be evident to one skilled in the art of computer design and programming. The MLC, once notified that the data connection should be started, now attempts to authenticate itself to the HLR 217, which is part of the core GSM network. In the preferred embodiment of the invention, the networks 214 and 215 should be bridged Ethernet networks by a bridge or hub 205 as the Multi-Link Client software uses Point to Point Protocol Over Ethernet (PPPOE) to set up a tunnel from the UE 201, 202 or 203 to an RLM 206. If another medium were to be used in networks 214 and 215 a different protocol could be used to encapsulate the data packets sent over the air link 218 that included the same required functionality: the ability to locate an RLM 206 that provides a tunnel server that can terminate a tunnel originated in the MLC and the ability to send the packets over the tunnel through an AP 204. An example of another protocol method that would work to tunnel packets from the UE 201, 202, or 203 to the RLM 206 is the Layer 2 Transport Protocol (L2TP). Still other examples are Generic Routing Encapsulation (GRE) protocol, IP in IP tunneling, Mobile IP, and Metricom's Ricochet Tunneling Protocol related to disparate mesh networks. There may be other examples that are equivalent but not foreseeable at the present time.

In this embodiment, the MLC on the UE 201, 202, or 203 acts as an L2TP Access Client and the network 214 and 215 is a routable network that uses the Internet protocol. In this embodiment a set of routers replace the bridge or hub 205 and functions to transport packets between the AP 204 and the RLM 206. The RLM acts as an L2TP Network Server. The MLC is configured with the IP address of the RLM 206. In an alternative embodiment, the MLC uses a standard Domain Name Service (DNS) Query to find the RLM 206. This query provides the required functionality; it finds the RLM 206 and allows for the tunneling of packets from the UE 201, 202, or 203 to the RLM 206. Other methods used to tunnel packets from the UE 201, 202, 203 to the RLM 206 will be evident to one skilled in the art of networking. The architecture does not limit the user to only one or two RLMs 206 per network, but allows for any number of RLMs 206 as needed for redundancy and capacity.

In a specific embodiment using IEEE 802.11 protocols, the AP 204 acts as a bridge, forwarding all data packets on the airlink 218 onto the bridged network 214 and forwarding all data packets from the bridged network 214 to the correct UE 201, 202, or 203. The WLAN radio 406 in the user equipment 201, 202, or 203 sends packets over the connection 408 to the antennae 407 over the air link 218 which are received by the AP 204. The WLAN radio 406 uses IEEE 802.11 protocol in order to attach to one of the APs 204.

Once the WLAN radio 406 is attached to an AP 204, it notifies the CPU 402 over the connection 413 and informs the device driver software resident in the non-volatile memory 403 or Random Access Memory (RAM) 401. The device driver software uses standard signaling through the CPU 402 and bus 409 or 410 to notify the MLC software of the attachment event. The MLC then sends out a PPPOE Active Discovery Initiation (PADI) packet to the device driver that causes the WLAN radio 406 to send it to the AP 204. The AP 204 will forward the PADI packet to the network 214. Because this packet is addressed to the broadcast Ethernet address on a bridged network, the packet will be replicated onto networks 215, 214 and air links 218.

All of the RLMs 206 desirous of accepting a connection will respond to the PADI packet with a unicast PPPOE Active Discover Offer (PADO) response packet addressed to the UE 201, 202, or 203. The PADO packet is received by the UE 201, 202, or 203 and forwarded to the MLC. The MLC has registered with the device driver of the WLAN Radio 406 to receive copies of all of these types of packets. The PADO packets contain the IEEE MAC address of the RLMs 206. In this manner, the MLC can discover the address of the RLMs 206. The MLC now uses this address over the bridged networks 214 and 215 and air link 218 in order to set up a PPPOE tunnel between itself and its chosen RLM 206. The MLC uses PPP encapsulated in the PPPOE protocol in order to negotiate a PPP connection with the RLM 206 using the source address of the PADO packet.

According to the invention, the MLC and the RLM 206 use an extensible authentication protocol, such as PPP or 802.1X, to pass the information required to authenticate the SIM card 417 to the HLR 208, as well as authenticate the RLM 206 to the MLC. Once the authentication is complete, information in the form of unique keys are provided by the HLR 208 to the RLM 206 and by the SIM card 417 to the MLC to enable them to set up a secure connection between the two devices. Every packet is encrypted with the unique key known only to the RLM 206 and the MLC. The MLC then acts as a firewall for the UE 201, 202, or 203 and drops all packets except those correctly encrypted with the unique key. The RLM 206 also acts as a firewall and drops all packets from network 215 except those correctly encrypted with the unique keys from UE 201, 202, or 203. This prevents the UE 201, 202, or 203 from being able to address an AP 204, another piece of user equipment 201, 202, or 203, the bridge 205, or any other core network elements of the GSM system except through the RLM 206 which encapsulates and forwards the packets through the core network to the GGSN 212 which only forwards the packets to the PDN 210 the Internet, thus also protecting all of the core network elements from any attacks from the UE 201, 202, or 203. In addition, since the MLC drops all packets not coming from the PPPOE tunnel of the RLM 206, there is no method for any other UE 201, 202, or 203, or any device, such as a hub or bridge 205 to inject packets that will be received by the UE, thus securing it from any attacks of any devices connected to the core network connection 212 or bridged network 214 and 215 or the air link 218, providing secure public packet forwarding for the UE 201, 202, or 203 and freeing the customer from worries of attack or abuse of the UE 201, 202, or 203.

Figure 5:
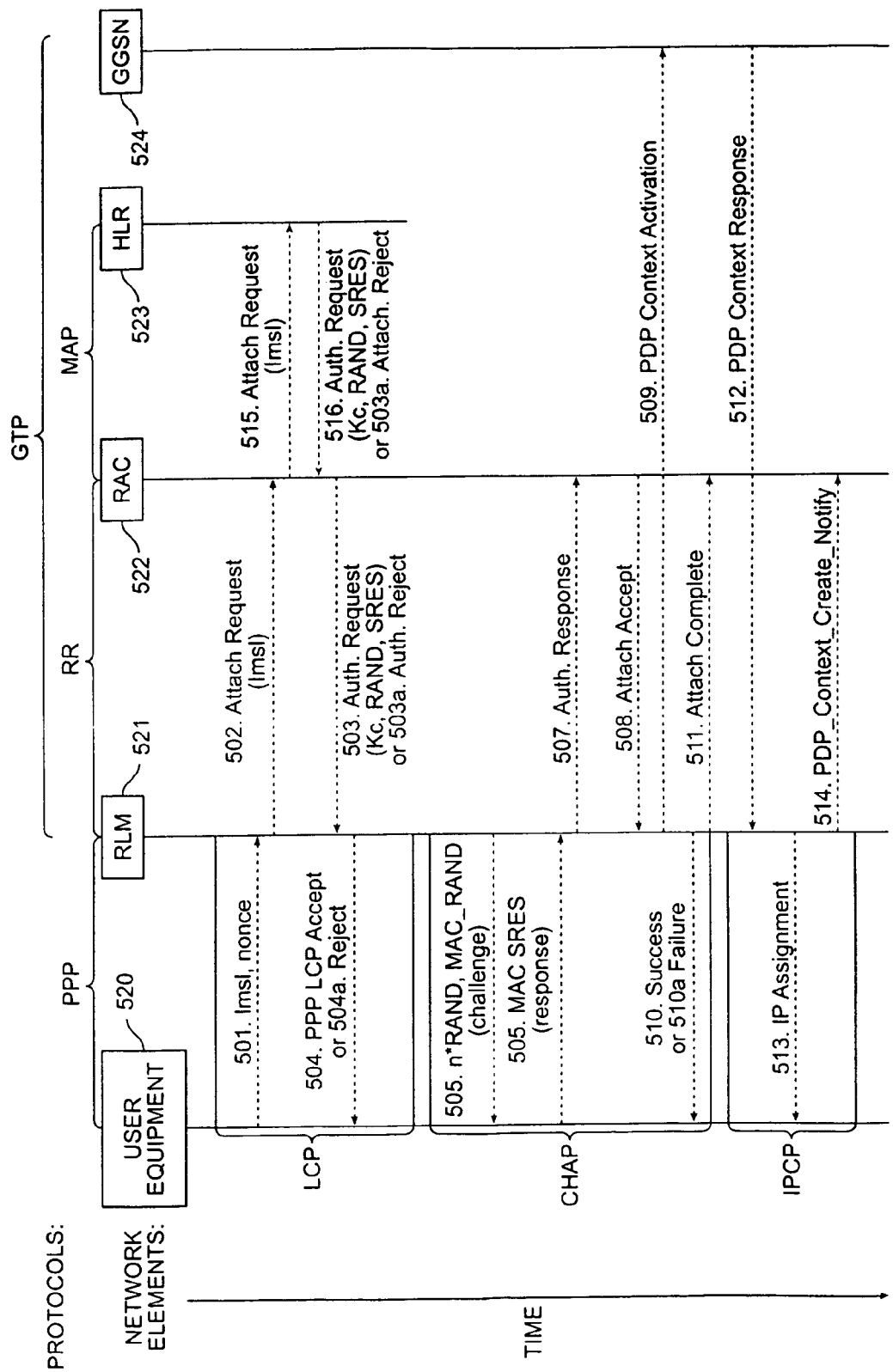
FIG. 5 depicts messages passed between the various elements of the ipRAN for WLAN and the GSM/GPRS core network for authentication of a customer.

Referring to the packet flow diagram of FIG. 5, messages are passed between the various network elements in the WLAN RAN and the core GSM/GPRS network for authentication of the customer's SIM card on the UE 520 to the HLR 523. These messages authorize that the customer can use WLAN and start billing and include the set-up messages used to create end-to-end tunnels from the UE 520 to the RLM 521 and from the RLM 521 to the GGSN 524, where data traffic is received and transmitted. As described above, the UE 520 finds the RLM 521 using PPPOE discovery packets and encapsulates PPP packets in this protocol in order to transport them between the UE 520 and the RLM 521. FIG. 5 shows packet communication between the separate network elements: the UE 520, the RLM 521, the RAC 522, the HLR 523, and the GGSN 524. Time increases from top to bottom. A separate number labels each packet or message with an arrowed line from the network element originating the packet and ending with the network element receiving the packet.

FIG. 5 also shows ordering of the packets. Packets that are sent earlier in time are closer to the top of the diagram. FIG. 5 also shows the names of selected protocols used between the UE 520 and the RLM 521, for informational purposes only. In a specific embodiment, the devices use PPP to send packets back and forth and to negotiate authentication and other network configuration needed to make the UE 520 a fully participating network element in the packet data network attached to the GGSN 524.

Between the UE 520 and the RLM 521 several sub-protocols of PPP may be used. These protocols include the Link Control Protocol (LCP), Challenge Authentication Protocol (CHAP), and IP Control Protocol (IPCP). Other protocols such as 802.1X may be used also. The packets or messages in each protocol are grouped together for informational purposes, with labels going down the left side of the diagram.

In a specific embodiment, the MLC on the UE 520 uses PPP to negotiate the LCP configuration option type 0x20, with length 18 containing the International Mobile Subscriber Identifier (IMSI) and the LCP configuration option type 0x21 with a length of 18 bytes for the nonce, a pseudo-random number 16 bytes long that varies in each instance as unpredictably as possible, by sending the PPP LCP configuration option packet 501 to the RLM 521.

Figure 6:
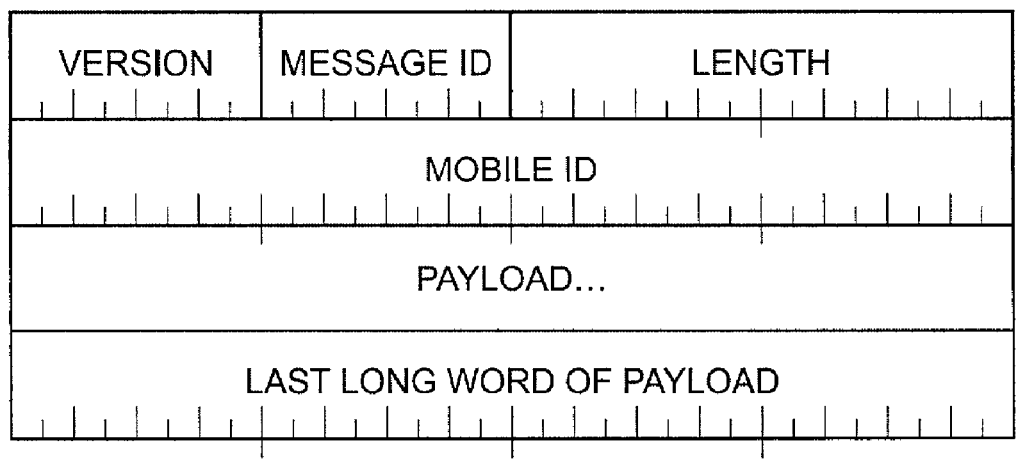
FIG. 6 depicts a preferred embodiment of the packet formats in the RR protocol between a Radio Link Manager and a Radio Access Controller.

Another method of providing this information is to use vendor-specific LCP configuration methods and fields. The RLM 521 receives the LCP options and remembers the nonce (a random number used for challenge) for later use. It then forwards the IMSI to the RAC 522 in the Attach Request packet 502 of the RAC to RLM (RR) protocol as described in Table 2. The RR protocol, as depicted in FIG. 6 and Table 1 in a specific embodiment, has an 8 bit version number, followed by an 8 bit message number, followed by a 16 bit length, in bytes of the message payload to follow, followed by the 32 bit identifier of the UE 520 as assigned by the RLM 521 and which consists of 20 bits of RLM 521 unique identification and 12 bits of unique identification for the UE 520 assigned by the RLM 521, followed by the message payload itself.

TABLE 1

| Message | ID |
|---|---|
| Attach Request | 0x01 |
| Auth Reject | 0x02 |
| Attach Accept | 0x04 |
| Attach Complete | 0x03 |
| Authentication Request | 0x12 |
| Authentication Response | 0x13 |

The message number in the RR protocol for each of the messages between the RAC and the RLM is listed in Table 1. The payloads of the Attach Request packet 502 for the RR protocol between the RAC and the RLM are described in Table 2.

TABLE 2

| Field_name | Size in bytes | Values | Description |
|---|---|---|---|
| Auth_Type | 1 | 0x1 | Designating IMSI |
| IMSI_Len | 1 | 0x07 to 0x10 | Length of IMSI in bytes |
| IMSI | IMSI_Len | IMSI | Unique identifier for mobile subscriber |
| Old_RAC | 8 | Unique RAC Identifier | Used for handoff information retrieval |

In a typical method according to the invention, the RAC 522 forwards the Attach Request to the HLR 523, all communications using the MAP protocol over an SS7 network. The HLR 523 either rejects the request with an Attach Reject 516*a*, if, for instance the customer has not paid their bill or the customer's cellular operator does not have a roaming agreement with this network operator; or asks the SIM card to authenticate itself by sending an Authentication Request packet 516 including the Kc, a key generated by secret parameters known only to the HLR and the SIM card, using A8 type GSM authentication protocols and one or more RANDs, a random number of 64 bits, and the Signed Response (SRES) that can be authenticated using A5 type authentication protocols, which proves that the HLR knows the secret shared with the SIM card and is used to provide authentication of the SIM card to the operator's network. The RAC 521 forwards the information in the Authentication Request packet 516 using the Authentication Request packet 503 of the RR protocol between the RAC and the RLM with the payload described in Table 3, typically over the Internet protocol.

TABLE 3

| Field_name | Size in bytes | Values | Description |
|---|---|---|---|
| RAND_Len | 1 | 1 to 16 | Length of RAND field in bytes |
| RAND | RAND_Len | Random number | Nonce Generated by the HLR |
| SRES_Len | 1 | 1 to 4 | Length of SRES field in bytes |
| SRES | SRES_Len | Signed response using the A3 GSM algorithm of the RAND and Kc | Generated by the HLR |
| Kc_Len | 1 | 1 to 8 | Length of Kc field in bytes |
| Kc | Kc_Len | Key generated using the A5 GSM algorithm and the RAND | Generated by the HLR |

Alternatively the RAC 521 forwards the information in the Attach Reject packet 516*a* using the Authentication Reject packet 503*a* of the RR protocol, as described in Tables 4 and 5, typically over the internet protocol to the RLM 521.

TABLE 4

| Field_name | Size in bytes | Values | Description |
|---|---|---|---|
| Reject_Code | 1 | Reject Reasons | Shown in Table 5 |

TABLE 5

| REJECT REASONS | Code |
| --- | --- |
| IMSI unknown in HLR | 0x02 |
| Illegal Subscriber Identifier | 0x03 |
| GPRS services not allowed | 0x07 |
| Subscriber identity cannot be determined | 0x09 |
| Implicitly Detached | 0x0A |

Table 5 shows reasons for rejecting the Attach Request and field value to place in Attach Reject packet's Reject_Code field. If the RLM receives the Authentication Request 503 it forwards the PPP LCP Accept message 504 to the UE 520 that allows the PPP client to continue its state machine and respond to authentication requests. If the RLM 521 receives the Authentication Reject message 503a it forwards the PPP LCP Reject message 504a to the UE 520 that then terminates the PPP negotiation.

After sending the PPP LCP Accept 504 message to the UE 520, the PPP state machine at the RLM 521 initiates a CHAP session by sending a challenge packet 505 in the preferred embodiment using the LCP configuration option type 3, authentication protocol value 0xc223 for CHAP. For the Algorithm field we use the value 0x88 for SIM-based authentication to designate our algorithm as described below. During the CHAP exchange the Challenge field data sent to the UE 520 in packet 505 from the RLM 521 consists of two 16 byte random numbers and the MAC_RAND, which is a signed version of the two random numbers combined with the nonce, the two Kcs, the IMSJ, and the two SRESs using the shah-1 algorithm, a hash algorithm. Other hash algorithms, such as MD-5 may also be used. A Kc can be generated by the MLC on the UE 520 from each RAND sent in message 503 to the RLM 521 and forwarded to the UE 520 in the CHAP challenge message 505 by sending each RAND to the SIM card 417 and getting a Kc as the response generated by the GSM algorithm A8. Using these generated keys, Kc, the UE 520 can then verify that the information in message 505 was signed correctly; if this is successful, it proves to the UE 520 that the RLM 521 was able to talk to the HLR 523 and knows the Kc, thus authenticating the RLM 521 is a legitimate interworking box for the customer's operator. The MLC in the UE 520 responds with the CHAP response message 506 that includes the MAC_SRES, which is a signed version of the two SRESs, the two Kcs, the nonce, and the IMSI sent to the RLM 521 in message 503 using the shah-1 algorithm. The UE 520 generates each SRES from the RAND sent to it in message 505 that was forwarded from the value in the RAND field of the Authentication Request packet 503 at the same time it generated the Kcs from the SIM card 417. When the RLM 521 receives the MAC_SRES it verifies that the MAC_SRES was signed correctly by the UE 520 thus verifying that the UE 520 has the correct SIM card 417, thus authenticating the customer's UE 520 to the RLM 521 or proving that the UE 520 could not authenticate itself by noticing the MAC_SRES was not signed correctly. The RLM 521 then forwards this authentication fact to the RAC 522 with an Authentication Response packet 507, the payload of which is shown in Table 6.

TABLE 6

| Field_name | Size in bytes | Values | Description |
| --- | --- | --- | --- |
| Auth_Response | 1 | 0x00 or 0x01 | Success or Failure respectively |

The RAC 522 then responds to the RLM 521 with an Attach Accept message 508 indicating it understood the authentication fact. Assuming a successful authentication, the RLM 521 sends a PDP Context Activation message 509 to the GGSN 524 over the GTP control protocol to inform the GGSN that a GTP tunnel should be set up for the UE 520 allowing the UE 520 to attach to the packet data network. The RLM 521 then sends a CHAP Success message 510 to the UE 520 to verify that the authentication was done correctly or a CHAP Failure message 510a if authentication was not successful. The RLM 521 then sends an Attach Complete message 511 to the RAC 522 so that it can complete its state machine and store the parameters of the UE 520 attach to be used for handover in the future. When the GGSN 524 is finished activating the GTP tunnel it sends a PDP Context Response message 512 to the RLM 521 which then sends the IP assignment information in message 513 to the UE 520, including the information necessary for the UE 520 to send IP packets to the PDN 306. The RLM 521 forwards notification of the GTP tunnel's successful creation to the RAC 522 in order to allow the RAC 522 to update its state machine and store the parameters of the UE 520's tunnel to be used for handover in the future.

Table 7 describes the payload of the attach accept packet.

TABLE 7

| Field_name | Size in bytes | Values | Description |
| --- | --- | --- | --- |
| RAC | 8 | RAC ID | Unique designation of serving RAC |
| Auth_Response | 1 | 0x00 or 0x01 | Success or Failure respectively |

Table 8 is a payload description of the attach complete packet 511.

TABLE 8

| Field_name | Size in bytes | Values | Description |
| --- | --- | --- | --- |
| Auth_Response | 1 | 0x00 or 0x01 | Success or Failure respectively |

The UE 520 has by this procedure now been successfully authenticated by the GSM/GPRS core network and has a pair of tunnels set up for it, the first, using PPPOE, is between the MLC on the UE 520 and the RLM 521; the second, using GTP, is between the RLM 521 and the GGSN 524. The PPPOE tunnel uses default encryption based on AES with the unique shared keys based on Kc, the nonce, and the IMSI which guarantees that packets sent by the UE 520 cannot be spoofed by anyone else on any network and that the packets are private and cannot be snooped by anyone else on the path from the UE 520 to the RLM 521. The RLM 521 takes the IP packets received from the UE 520 on the PPPOE tunnel that are successfully decoded and places them in the GTP tunnel to the GGSN 524. The GGSN 524 takes those packets and sends them to the PDN 306. Data packets addressed to the UE 520 are received by the GGSN 524 who, for connecting to the packet data network of the Internet, advertises a public route to the IP address assigned to the UE 520. The GGSN 524 places those packets in the GTP tunnel and sends them to the RLM 521. The RLM 521 takes those packets, encrypts them and forwards them to the UE 520 over the PPPOE tunnel. The MLC on the UE 520 takes the received packets over the PPPOE tunnel, and after successfully decrypting them, passes them up the stack to other processes on the UE 520, thus providing a packet data network connection, typically an internet connection, to the UE 520. In this manner, the preferred embodiment of the invention provides for secure, authenticated access to packet data networks through an operator's unmodified core GSM/GPRS network for a UE 520 that only has a WLAN radio 416 and SIM card reader 416 and SIM card 417.

The invention has been explained with reference to specific embodiments. Other embodiments will be evident to those of ordinary skill in the art. It is therefore not intended that the invention be limited, except as indicated by the appended claims.

What is claimed is:

1. A method for authenticating a WLLAN radio user device in a wireless local area network radio access network (WLAN RAN) using a core network supporting GSM protocols comprising:
   connecting a Radio Access Controller (RAC), a Radio Link Manager (RLM), and a WLAN Access Point (WLAN AP) to a Home Location Register (HLR) of a said core network;
   establishing communication of the WLAN radio user device with the WLAN AP and the RLM;
   authenticating the user device having Multilink Client (MLC) capabilities to the HLR;
   thereafter attaching the user device to the core network system by:
   connecting a first datalink tunnel from the MLC to the RLM, and a second datalink tunnel from the RLM to the GGSN packet gateway for a global packet data network;
   wherein the RAC provides protocol stacks and interworking functions to allow the MLC to talk to the HLR.

2. The method according to claim 1 wherein said authenticating step further includes thereafter connecting a second datalink tunnel from the RLM to an Internet gateway with tunneling capabilities and address assignment capabilities as part of a global packet data network.

3. The method according to claim 2 wherein the Internet gateway employs Layer 2 Transport Protocol.

4. The method according to claim 1 further including the step of using a shared key shared between the user device and the HLR to establish said first datalink tunnel as a secure datalink tunnel.

5. A method for interconnecting a wireless local area network radio access network (WLAN RAN) to a GSM core network supporting GPRS packet protocol comprising:
   connecting a Radio Access Controller (RAC), a Radio Link Manager (RLM), and a WLAN Access Point (WLAN AP) to a GPRS Gateway Serving Node (GGSN) and a Home Location Register (HLR) of a said core network;
   establishing communication of a WLAN radio user device with the WLAN AP;
   authenticating the user device having Multilink Client (MLC) capabilities to the HLR;
   thereafter attaching the user device to the core network system by:
   connecting a first datalink tunnel from the MLC to the RLM, and second datalink tunnel from the RLM to the GGSN packet gateway for a global packet data network;
   wherein the RAC provides protocol stacks and interworking functions to allow the MLC to talk to HLR.

6. The method according to claim 5 wherein said authenticating step further includes thereafter connecting a second datalink tunnel from the RLM to an Internet gateway with tunneling capabilities and address assignment capabilities as part of a global packet data network.

7. The method according to claim 6 wherein the Internet gateway employs Layer 2 Transport Protocol.

8. A method for mutually authenticating a user device and a GSM core network via a wireless local area network radio access network (WLAN RAN), the GSM core network supporting GPRS packet protocols, said method comprising:
   initiating a wireless attach request from the user device;
   transmitting from the user device an identification number (IMSI) and a fresh random number associated with the user (nonce) via a wireless link to a radio link manager;
   thereafter forming a conventional attach request using the IMSI and the nonce;
   thereafter conveying the conventional attach request to a home location register; generating at the home location register a conventional authentication request using a 1) shared key of the user device, 2) the imsi and 3) the nonce, the conventional authentication request including as an element a conventional digital signature;
   thereafter conveying the conventional authentication request to the radio link manager;
   thereafter forming at the radio link manager a first secure digital signature of said conventional authentication request using the nonce and all elements of the conventional authentication request;
   thereafter conveying the first secure digital signature and a modified conventional authentication request having removed therefrom said conventional digital signature to the user device;
   constructing at the user device a candidate duplicate of the conventional digital signature from the modified conventional authentication request using the shared key, IMSI and nonce;
   verifying the candidate duplicate and the modified conventional authentication request at the user device using 1) the first secure digital signature, 2) the candidate duplicate and 3) the modified conventional authentication request to authenticate the radio link manager to the user device;
   thereafter constructing at the user device a second secure digital signature from the verified duplicate of the conventional digital signature using the shared keyed, IMSI, and the nonce and the verified modified conventional authentication request; and
   thereafter reporting the second secure digital signature to the radio link manager to verify authentication of the user device to the radio link manager.

9. A method for authenticating a WLAN radio user device in a wireless local area network radio access network (WLAN RAN) using a core network supporting GSM protocols comprising:
   connecting a Radio Access Controller (RAC), a Radio Link Manager (RLM), and a WLAN Access Point (WLAN AP) to a Home Location Register (HLR) of a said core network;
   establishing communication of the WLAN radio user device with the WLAN AP and the RLM;

authenticating the user device having Multilink Client (MLC) capabilities to the HLR; and thereafter attaching the user device to the core network system by: connecting a first datalink tunnel from the MLC to the RLM;

wherein said authenticating step comprises: initiating a wireless attach request from the user device; transmitting from the user device an identification number (IMSI) and a fresh random number associated with the user (nonce) via a wireless link to a radio link manager; thereafter forming a conventional attach request; thereafter conveying the conventional attach request to a home location register using the IMSI and the nonce; generating at the home location register a conventional authentication request using a 1) shared key of the user device, 2) the imsi and 3) the nonce, the conventional authentication request including as an element a conventional digital signature; thereafter conveying the conventional authentication request to the radio link manager; thereafter forming at the radio link manager a first secure digital signature of said conventional authentication request using the nonce and all elements of the conventional authentication request; thereafter conveying the first secure digital signature and a modified conventional authentication request having removed therefrom said conventional digital signature to the user device;

constructing at the user device a candidate duplicate of the conventional digital signature from the modified conventional authentication request using the shared key, IMSI, and nonce; verifying the candidate duplicate and the modified conventional authentication request at the user device using 1) the first secure digital signature, 2) the candidate duplicate and 3) the modified conventional authentication request to authenticate the radio link manager to the user device; thereafter constructing at the user device a second secure digital signature from the verified duplicate of the conventional digital signature using the shared keyed and the verified modified conventional authentication request; and thereafter reporting the second secure digital signature to the radio link manager to verify authentication of the user device to the radio link manager.

10. A system for interconnecting a wireless local area network radio access network (WLAN RAN) to a GSM core network supporting GPRS packet protocols comprising:
a Radio Access Controller (RAC);
a Radio Link Manager (RLM);
a WLAN Access Point (WLAN AP);
a GPRS Gateway Serving Node (GGSN);
a Home Location Register (HLR) of a said core network;
at least one WLAN radio user device for communication with the WLAN AP;
means for authenticating the user device to the HLR, said user device having Multilink Client (MLC) capabilities; and
means for attaching the user device to the core network system using a first datalink tunnel from the MLC to the RLM and a second datalink tunnel from the RLM to the GGSN packet gateway for a global packet data network
wherein the RAC provides protocol stacks and interworking functions to allow the MLC to talk to the HLR.

11. A system for interconnecting a wireless local area network radio access network (WLAN RAN) to a GSM core network comprising:
a Radio Access Controller (RAC);
a Radio Link Manager (RLM); a WLAN Access Point (WLAN AP); an Internet Gateway Node;
a Home Location Register (HLR) of a said core network;
at least one WLAN radio user device for communication with the WLAN AP;
means for authenticating the user device to the HLR, said user device having Multilink Client (MLC) capabilities; and
means for attaching the user device to the core network system using a first datalink tunnel from the MLC to the RLM and a second datalink tunnel from the RLM to the Internet Gateway Node for a global packet data network
wherein the RAC provides protocol stacks and interworking functions to allow the MLC to talk to the HLR.

* * * * *